(12) United States Patent
Kwag et al.

(10) Patent No.: US 11,553,232 B2
(45) Date of Patent: Jan. 10, 2023

(54) CONTROLLER CAPABLE OF DETECTING USER'S FINGERPRINT

(71) Applicant: Samsung Display Co., Ltd., Yongin-Si (KR)

(72) Inventors: Jinoh Kwag, Suwon-Si (KR); Yong-Han Park, Hwaseong-Si (KR)

(73) Assignee: Samsung Display Co., Ltd.

( * ) Notice: Subject to any disclaimer, the term of this patent is extended or adjusted under 35 U.S.C. 154(b) by 0 days.

(21) Appl. No.: 17/271,180

(22) PCT Filed: Jun. 27, 2019

(86) PCT No.: PCT/KR2019/007793
§ 371 (c)(1),
(2) Date: Feb. 24, 2021

(87) PCT Pub. No.: WO2020/040419
PCT Pub. Date: Feb. 27, 2020

(65) Prior Publication Data
US 2021/0337261 A1 Oct. 28, 2021

(30) Foreign Application Priority Data

Aug. 24, 2018 (KR) ........................ 10-2018-0099331
Oct. 4, 2018 (KR) ........................ 10-2018-0118467

(51) Int. Cl.
*H04N 21/422* (2011.01)
*G06F 21/32* (2013.01)
*H04N 21/4415* (2011.01)

(52) U.S. Cl.
CPC ....... *H04N 21/42222* (2013.01); *G06F 21/32* (2013.01); *H04N 21/42203* (2013.01); *H04N 21/4415* (2013.01)

(58) Field of Classification Search
None
See application file for complete search history.

(56) References Cited

U.S. PATENT DOCUMENTS

| 10,133,903 | B2 | 11/2018 | Kim et al. |
| 10,664,677 | B2 | 5/2020 | Lee et al. |
| 2010/0231356 | A1 | 9/2010 | Kim |
| 2011/0167454 | A1 | 7/2011 | Beppu |

(Continued)

FOREIGN PATENT DOCUMENTS

| CN | 101833651 A | 9/2010 |
| CN | 103780960 A | 5/2014 |

(Continued)

OTHER PUBLICATIONS

Chinese Office Action corresponding to Application No. 201980055123.6 dated Nov. 14, 2022, 11 pages.

*Primary Examiner* — Samira Monshi
(74) *Attorney, Agent, or Firm* — Innovation Counsel LLP

(57) ABSTRACT

A controller (e.g., a remote control) stores channel information preferred by the user or program information preferred by the user. The controller recognizes the user by detecting the user's fingerprint, and controls the display device or a set-top box that communicates with the display device such that a list corresponding to the recognized channel information preference or a list corresponding to program information is displayed on the display device.

18 Claims, 15 Drawing Sheets

(56) References Cited

U.S. PATENT DOCUMENTS

| | | | | |
|---|---|---|---|---|
| 2013/0010209 A1* | 1/2013 | Takiguchi | ......... | H04N 21/4852 |
| | | | | 348/739 |
| 2017/0206398 A1* | 7/2017 | Kim | ....................... | G06F 21/32 |
| 2017/0308733 A1 | 10/2017 | Gao | | |

FOREIGN PATENT DOCUMENTS

| | | | |
|---|---|---|---|
| CN | 105141997 | A | 12/2015 |
| CN | 105959749 | A | 9/2016 |
| CN | 108206013 | A | 6/2018 |
| JP | 2001-028790 | A | 1/2001 |
| KR | 20-0369832 | Y1 | 12/2004 |
| KR | 10-2016-0012027 | A | 2/2016 |
| KR | 10-2016-0109058 | A | 9/2016 |

\* cited by examiner

Unregistered User

CONTROLLER CAPABLE OF DETECTING USER'S FINGERPRINT

CROSS-REFERENCE TO RELATED APPLICATION(S)

This application claims priority to PCT Application No. PCT/KR2019/007793 filed on Jun. 27, 2019, Korean Application No. 10-2018-0099331 filed on Aug. 24, 2018 and Korea Application No. 10-2018-0118467 filed on Oct. 4, 2018, all of which are incorporated by reference.

TECHNICAL FIELD

The present disclosure herein relates to a controller capable of detecting a fingerprint.

BACKGROUND ART

With the development of Internet technology and digital TV technology, Internet Protocol Television (IP TV) services that provide television services using high-speed Internet networks are commercially available. The IP TV services are interactive TV service implemented by connecting a TV and a content providing server, which are connected to an Internet network through a streaming device SD.

A controller for controlling a TV or a set-top-box, for example, a remote control, may have a communication part to control the TV or the set-top-box.

Since the IP TV usually includes a large number of channels, in order to find a program that a user wants, there is a hassle of having to check through numerous channels one by one.

SUMMARY

A controller according to an embodiment of the inventive concept may include a memory part, a sensor part, a control part, and a communication part.

The memory part may store a plurality of fingerprint information and a plurality of preference information, wherein each of the plurality of fingerprint information is associated with one of the plurality of preference information. The sensor part may include a fingerprint detection module for detecting a fingerprint. The control part may determine fingerprint information corresponding to the fingerprint detected by the fingerprint detection module among the plurality of fingerprint information, and select preference information associated with the determined fingerprint information. The communication part may transmit the selected preference information to a first external device.

In an embodiment of the inventive concept, when the first external device or a second external device communicating with the first external device displays an image, the communication part may receive, from the first external device or the second external device, at least one of information on a date when the image is displayed, information on a time when the image is displayed, information on a period while the image is displayed, channel information corresponding to the image, and program information corresponding to the image.

In an embodiment of the inventive concept, the first external device may be a display device, wherein the second external device may be a set-top box.

In an embodiment of the inventive concept, the control part may update the selected preference information using the at least one information received by the communication part.

In an embodiment of the inventive concept, the control part may calculate preference channel information using the selected preference information, wherein the communication part may transmit the calculated preference channel information to at least one of the first external device and the second external device, and control at least one of the first external device and the second external device to display a preference channel list image corresponding to the calculated preference channel information.

In an embodiment of the inventive concept, the control part may calculate preference program information using the selected preference information, wherein the communication part may transmit the calculated preference program information to at least one of the first external device and the second external device, and control at least one of the first external device and the second external device to display a preference program list image corresponding to the calculated preference program information.

In an embodiment of the inventive concept, when a fingerprint detected by the sensor part corresponds to any one of the plurality of fingerprint information stored in the memory part, the communication part may transmit a control signal to at least one of the first external device and the second external device to display an image asking whether the first external device or the second external device uses a user preference mode.

In an embodiment of the inventive concept, when the fingerprint detected by the sensor part does not correspond to the plurality of fingerprint information stored in the memory part, the communication part may transmit a control signal to at least one of the first external device and the second external device to display an image asking whether the first external device or the second external device proceeds with user registration.

In an embodiment of the inventive concept, the controller may further include a power button for turning on or off the power of at least one of the first external device and the second external device, wherein the fingerprint detection module may be mounted on the power button.

In an embodiment of the inventive concept, when first detection information corresponding to a fingerprint detected when the power of the first external device and the second external device is turned on using the power button and second detection information corresponding to a fingerprint detected when the first external device or the second external device is turned off using the power button are the same, the at least one information received from the first external device or the second external device may be stored in the memory part.

In an embodiment of the inventive concept, when the first detection information and the second detection information are different, the at least one piece of information received from the first external device or the second external device may not be stored in the memory part.

In an embodiment of the inventive concept, the controller may further include a channel selection button for changing the image displayed by the first external device or the second external device, wherein the fingerprint detection module may be mounted on the channel selection button.

In an embodiment of the inventive concept, the sensor part may further include at least one of a voice recognition sensor and a motion recognition sensor.

In an embodiment of the inventive concept, a controller may include a memory part, an input part, a sensor part, and a communication part.

The memory part may store a plurality of fingerprint information and a plurality of preference information, wherein each of the plurality of fingerprint information. The input part may include a power button capable of turning on or off power of at least one of a display device and a set-top box. The sensor part may include a fingerprint detection module with a plurality of sensors for detecting a fingerprint, wherein the plurality of sensors may be mounted on the power button. The control part may determine fingerprint information corresponding to the fingerprint detected by the fingerprint detection module from among the plurality of fingerprint information, and select preference information corresponding to the determined fingerprint information among the plurality of preference information. The communication part may transmit the selected preference information to at least one of the display device and the set-top box.

According to the inventive concept, a controller (e.g., a remote control) may extract user information by recognizing a user's fingerprint, and a display device may display the extracted program preferred by a user. Accordingly, a user may save the trouble of finding a program that the user wants, thereby saving time for searching for a program to watch.

DETAILED DESCRIPTION

Figure 1:
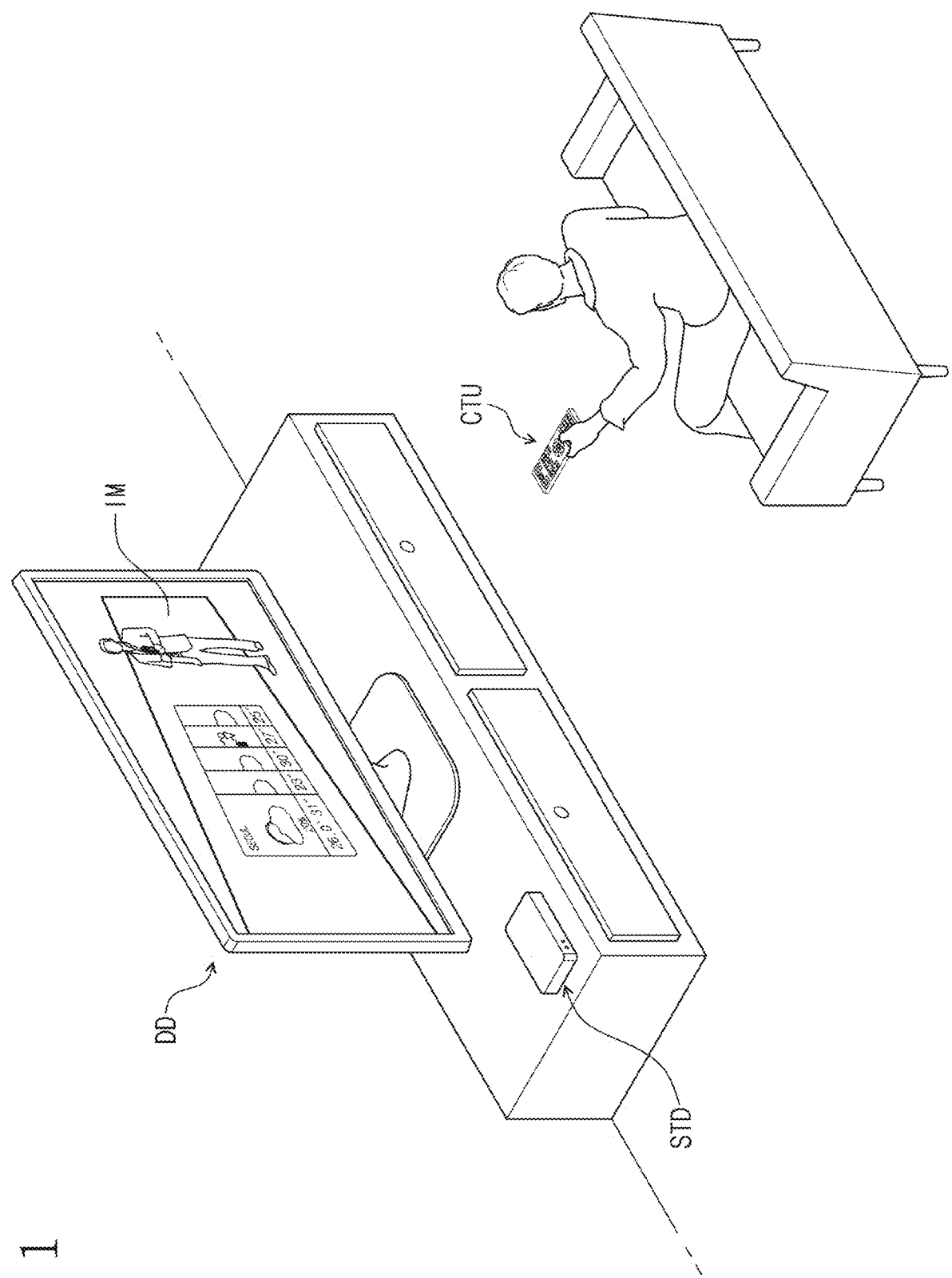
FIG. 1 exemplarily shows that a user uses a display device, a set-top box, and a controller.

The disclosure pertains to a controller (e.g., a remote control) that recognizes a fingerprint and accesses usage data associated with the fingerprint.

Hereinafter, embodiments of the inventive concept will be described with reference to the drawings.

In the drawings, ratios and dimensions of components are exaggerated for effective description of technical content. "And/or" includes all of one or more combinations defined by related components.

In various embodiments of the inventive concept, the term "include" specifies a property, a region, a fixed number, a step, a process, an element and/or a component but does not exclude other properties, regions, fixed numbers, steps, processes, elements and/or components.

FIG. 1 exemplarily shows that a user uses a display device DD, a set-top box STD, and a controller CTU. The controller CTU may be physically separate from or separable from the display device DD, such as a remote control.

The display device DD displays an image IM. In FIG. 1, a screen for transmitting weather information is illustrated as an example of the image IM.

The display device DD may be a liquid crystal display device, an organic light emitting display device, a quantum dot display device, or a plasma display device.

The set-top box STD is a device capable of communicating with the display device DD. The set-top box STD may provide image data received from a source other than the display device DD and transmit the image data to the display device DD. The set-top box STD is a home communication terminal for interactive multimedia communication and may play a role of connecting the display device DD with an external network. A set-top box STD may be a device that communicates with a satellite receiver, a cable box, a game console (Xbox, Playstation, Nintendo, etc.), or a streaming device (e.g., Roku streaming stick, Google Chromecast, Amazon Fire TV/Stick/Cube, TiVo Stream, Apple tvOS), although this is not an exhaustive list.

If there is no set-top box STD, the display device DD may display only images provided by some channels. However, when there is a set-top box STD, the display device DD may display images provided by a large number of channels.

The controller CTU may control the display device DD, the set-top box STD, or both. For example, the user may turn on or turn off at least one of the display device DD and the set-top box STD using the controller CTU. The user may change the channel provided by the display device DD or the set-top box STD by using the controller CTU. The user may control the volume of an image provided by the display device DD or the set-top box STD using the controller CTU. That is, the controller CTU may be understood as a remote controller or a device including a remote control function.

Figure 2A:
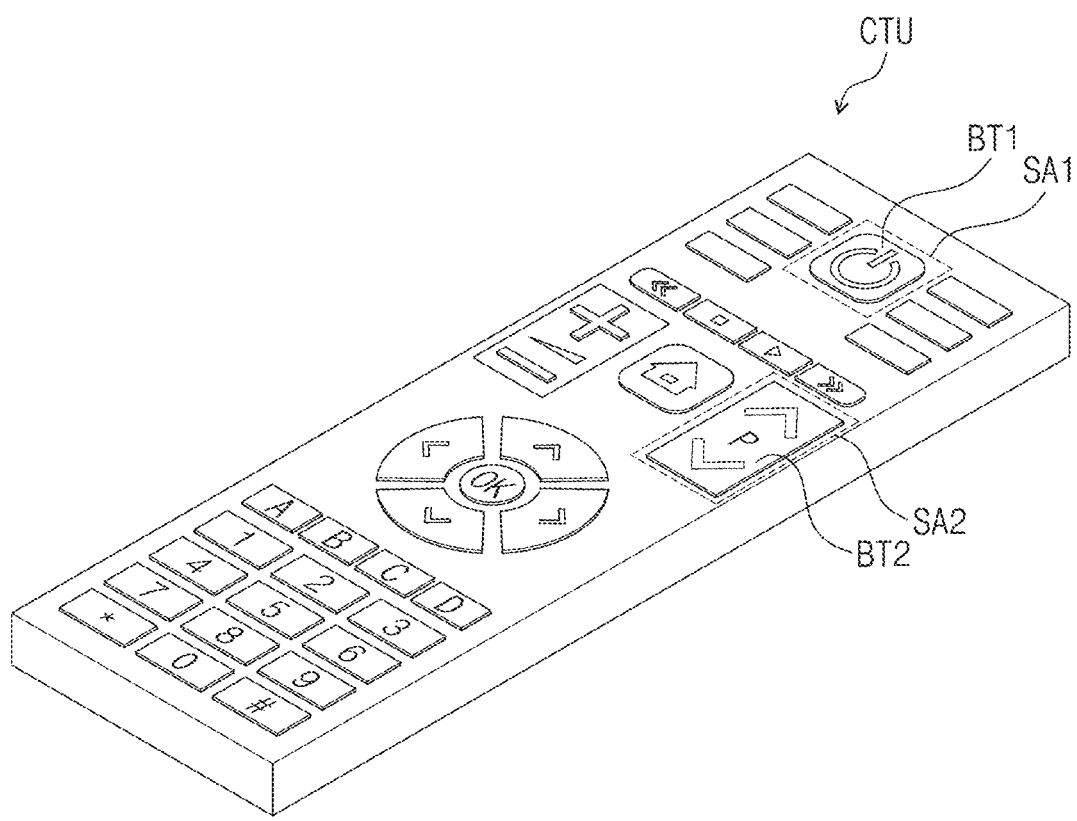
FIG. 2A is a perspective view showing a controller according to an embodiment of the inventive concept.
Figure 2B:
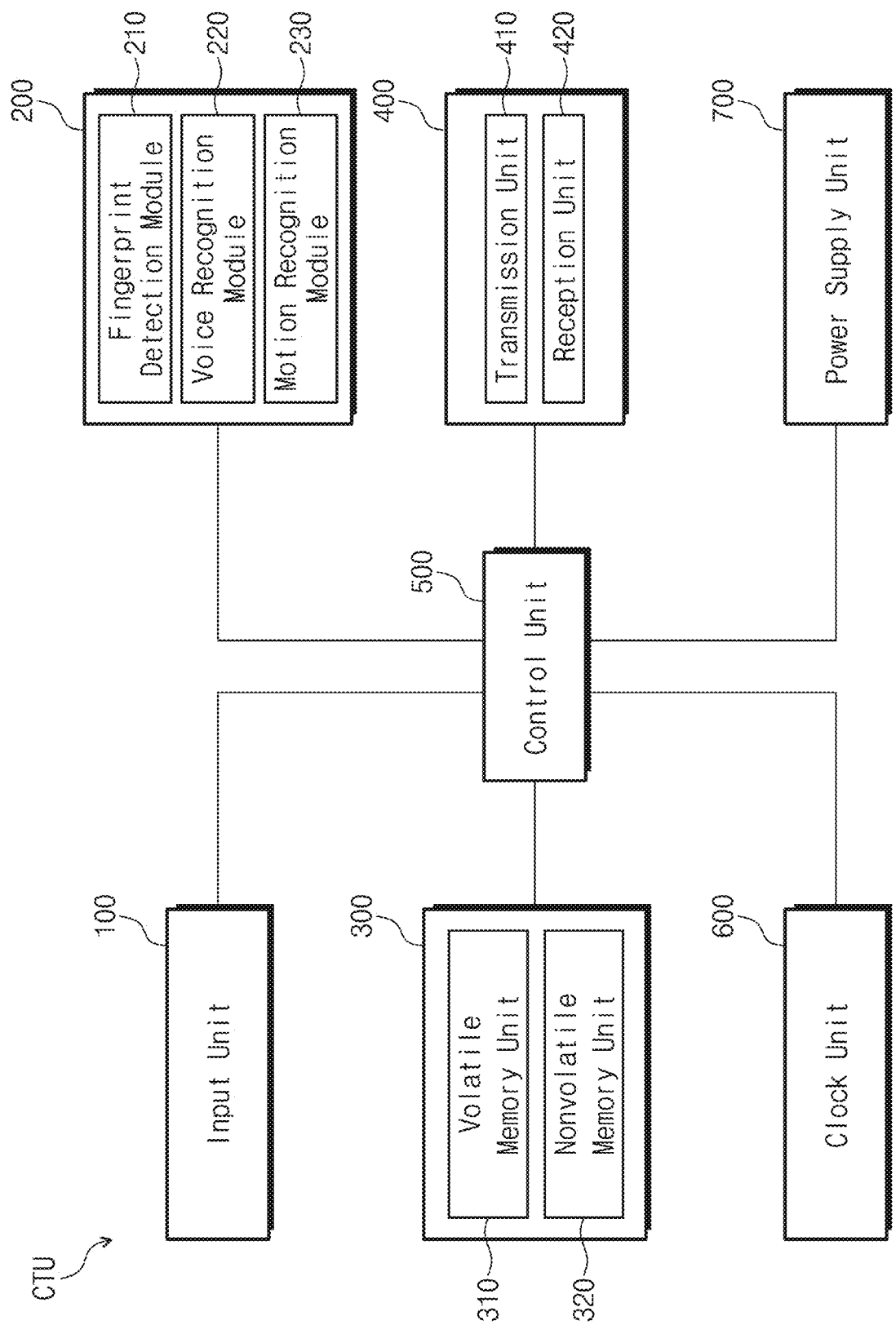
FIG. 2B is an exemplary block diagram of a controller shown in FIG. 2A.

FIG. 2A is a perspective view showing a controller CTU according to an embodiment of the inventive concept. FIG. 2B is an exemplary block diagram of the controller CTU shown in FIG. 2A.

Referring to FIG. 2A, the controller CTU may include a plurality of buttons BT1 and BT2.

The first button BT1 may be a power button for turning on or off the display device DD, the set-top box STD, or both.

The second button BT2 may be a channel button for changing a channel corresponding to an image displayed by the display device DD.

Sensing areas SA1 and SA2 for recognizing a user's fingerprint may be defined on the surface of the controller CTU.

In an embodiment of the inventive concept, the first sensing area SA1 may correspond to an area in which the first button BT1 is disposed, and the second sensing area SA2 may correspond to an area in which the second button BT2 is disposed. In this case, a fingerprint detection module for recognizing a fingerprint contacting the first sensing area SA1 may be mounted on the first button BT1, and a fingerprint detection module for recognizing a fingerprint contacting the second sensing area SA2 may be mounted on the second button BT2.

However, the inventive concept is not limited thereto, and in another embodiment of the inventive concept, only one of the first sensing area SA1 and the second sensing area SA2 may be defined. Further, in another embodiment of the inventive concept, the first sensing area SA1 or the second sensing area SA2 may be defined in an area where the first button BT1 or the second button BT2 is not disposed.

Referring to FIG. 2B, the controller CTU may include an input part 100, a sensing unit 200, a memory part 300, a communication part 400, a control part 500, a clock part 600, and a power supply unit 700.

The input part 100 is a part for receiving an input from a user, and may include the buttons BT1 and BT2. Users may transmit a desired signal to the display device DD or the set-top box STD through the input part 100.

The sensing unit 200 may detect a user's fingerprint, voice, or motion. The controller CTU may recognize who a user using the controller CTU is based on a fingerprint signal detected by the sensing unit 200.

In one embodiment of the inventive concept, the sensing unit 200 may include a fingerprint detection module 210, a voice recognition module 220, and a motion recognition module 230.

The fingerprint detection module 210 is a sensor for detecting a fingerprint in contact with the first sensing area SA1 or the second sensing area SA2.

The voice recognition module 220 is a sensor for recognizing the voice of a person using the controller CTU. In an embodiment of the inventive concept, the controller CTU may recognize the user by using the user's voice detected through the voice recognition module 220.

The motion recognition module 230 is a sensor for recognizing a motion of a person using the controller CTU, and may be, for example, a gyroscope sensor. In an embodiment of the inventive concept, the controller CTU may recognize the user by using the user's motion detected through the motion recognition module 230.

In another embodiment of the inventive concept, the sensing unit 200 may not include the voice recognition module 220 or the motion recognition module 230.

The memory part 300 may include a volatile memory part 310 and a nonvolatile memory part 320.

The volatile memory part 310 may include DRAM, SRAM, or FeRAM. The nonvolatile memory part 320 may include NAND FLASH, SSD or HDD.

In an embodiment of the inventive concept, a plurality of fingerprint information and a plurality of preference information may be stored in the memory part 300.

The fingerprint information corresponds to each of the users, and may be obtained by converting a fingerprint image of each of the users into data.

The preference information corresponds to each of the fingerprint information, and may be data of TV channels or TV programs preferred by each user.

That is, in the memory part 300, fingerprint information corresponding to each of the users and preference information corresponding to each of the users may be stored in the form of a lookup table.

Table 1 exemplarily shows a lookup table stored in the memory part 300. The communication part 400 may be a module for communicating with external devices (e.g., a display device or a set-top box).

The communication part 400 may include a transmission unit 410 for transmitting information to an external device and a reception unit 420 for receiving information from an external device.

In an embodiment of the inventive concept, the communication part 400 may use a frequency of 30 kHz to 50 kHz.

The control part 500 may be a module that controls the input part 100, the sensing unit 200, the memory part 300, the communication part 400, the clock part 600, and the power supply unit 700.

The control part 500 may perform an operation of comparing the information input through the input part 100 and the information detected by the sensing unit 200 with information stored in the memory part 300, or transmit the calculated result to an external device through the communication part 400. In addition, the control part 500 may store information received through the communication part 400 in the memory part 300 or perform an operation of comparing with data stored in the memory part 300. Also, the control part 500 may update information previously stored in the memory part 300 by using information received through the communication part 400.

In an embodiment of the inventive concept, the control part 500 may be a central processing unit (CPU), a micro processor unit (MPU), or an execution processing unit (EPU).

The clock part 600 may be a module for determining a current time or determining a time (or period) during which external devices (display devices or set-top boxes) controlled through the controller CTU are driven.

The power supply unit 700 may be a module that provides power required to drive the input part 100, the sensing unit 200, the memory part 300, the communication part 400, the control part 500, and the clock part 600.

Figure 3:
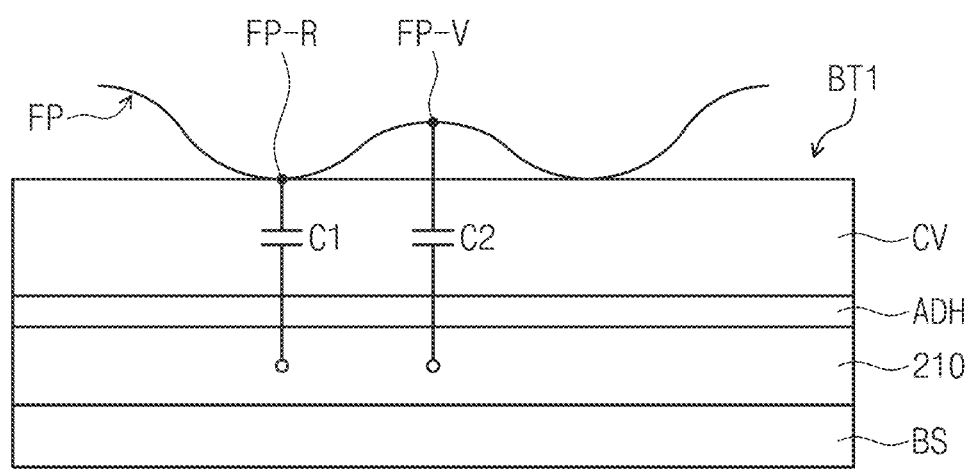
FIG. 3 is a perspective view showing a user's finger contacting a controller according to an embodiment of the inventive concept.

FIG. 3 is a perspective view illustrating that a user's finger is in contact with the first button BT1 of the controller CTU according to an embodiment of the inventive concept.

The first button BT1 may include a cover part CV, an adhesive member ADH, a fingerprint detection module 210, and a base part BS.

The cover part CV may protect internal components and provide a fingerprint detection surface to the user. In one embodiment of the inventive concept, the cover part CV may include synthetic resin or glass.

The adhesive member ADH may be a pressure sensitive adhesive film (PSA). The fingerprint detection module 210 and the cover part CV may be adhered by the adhesive member ADH.

The fingerprint detection module 210 may be disposed on the base part BS.

The fingerprint detection module 210 may include a plurality of sensors SN (see FIG. 4) for detecting whether an external object is in contact or a fingerprint. In FIG. 3, some

TABLE 1

| Order | Monday | Tuesday | Wednesday | Thursday | Friday | Saturday | Sunday |
|---|---|---|---|---|---|---|---|
| 1 | ch1 | ch3 | ch1 | ch8 | ch9 | ch2 | ch1 |
| 2 | ch2 | ch7 | ch2 | ch7 | ch3 | ch3 | ch3 |
| 3 | ch3 | ch8 | ch3 | ch3 | ch5 | ch5 | ch5 |
| 4 | ch4 | ch3 | ch4 | ch4 | ch2 | ch1 | ch7 | of the fingerprints FP of the fingers in contact with the cover part CV are illustrated as an example.

The fingerprint FP includes a ridge FP-R and a valley FP-V. The ridge FP-R may form the first capacitance C1 with the fingerprint detection module 210, and the valley FP-V may form the second capacitance C2 with the fingerprint detection module 210. At this time, the first capacitance C1 is different from the second capacitance C2. The fingerprint detection module 210 may recognize the fingerprint FP by using a difference between the first capacitance C1 and the second capacitance C2.

Although not shown in the drawing, the second button BT2 may also include substantially the same components as the first button BT1 illustrated in FIG. 3.

Figure 4:
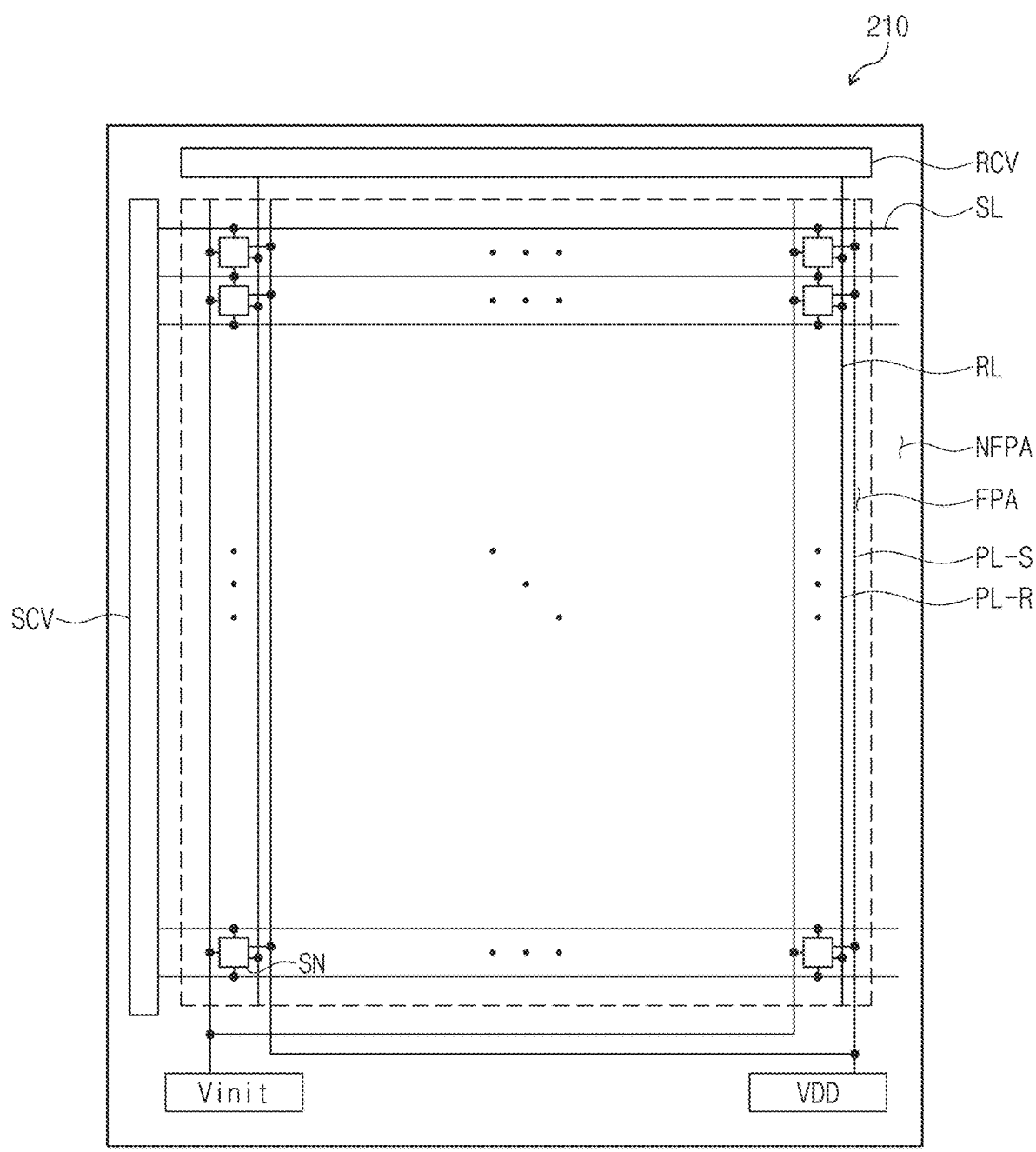
FIG. 4 is a plan view of a fingerprint detection module according to an embodiment of the inventive concept.
Figure 5:
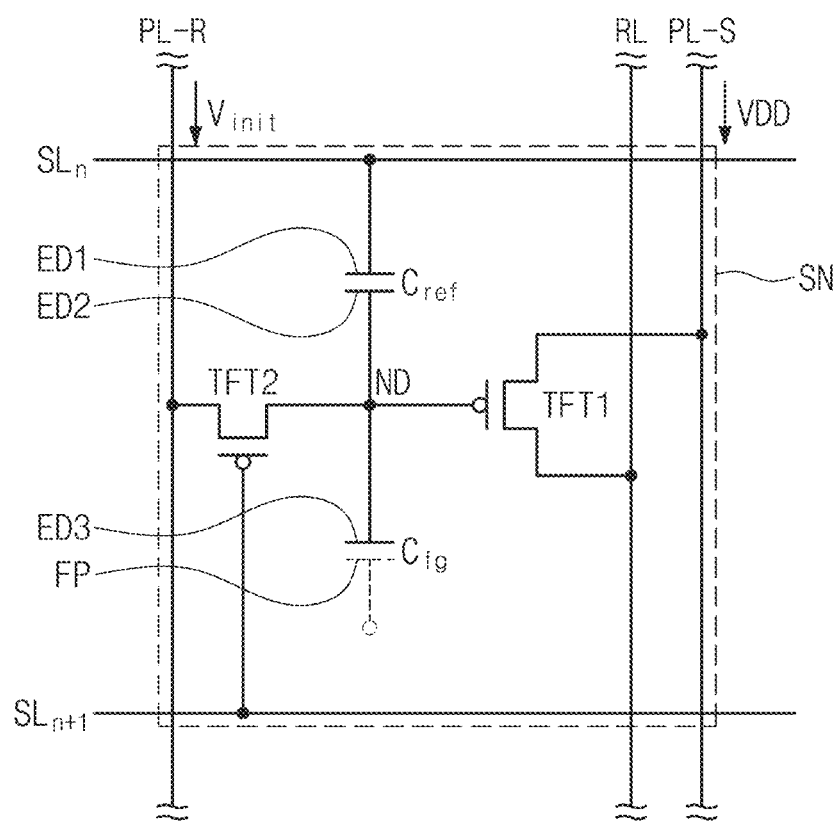
FIG. 5 is an equivalent circuit diagram of a sensor according to an embodiment of the inventive concept.
Figure 6:
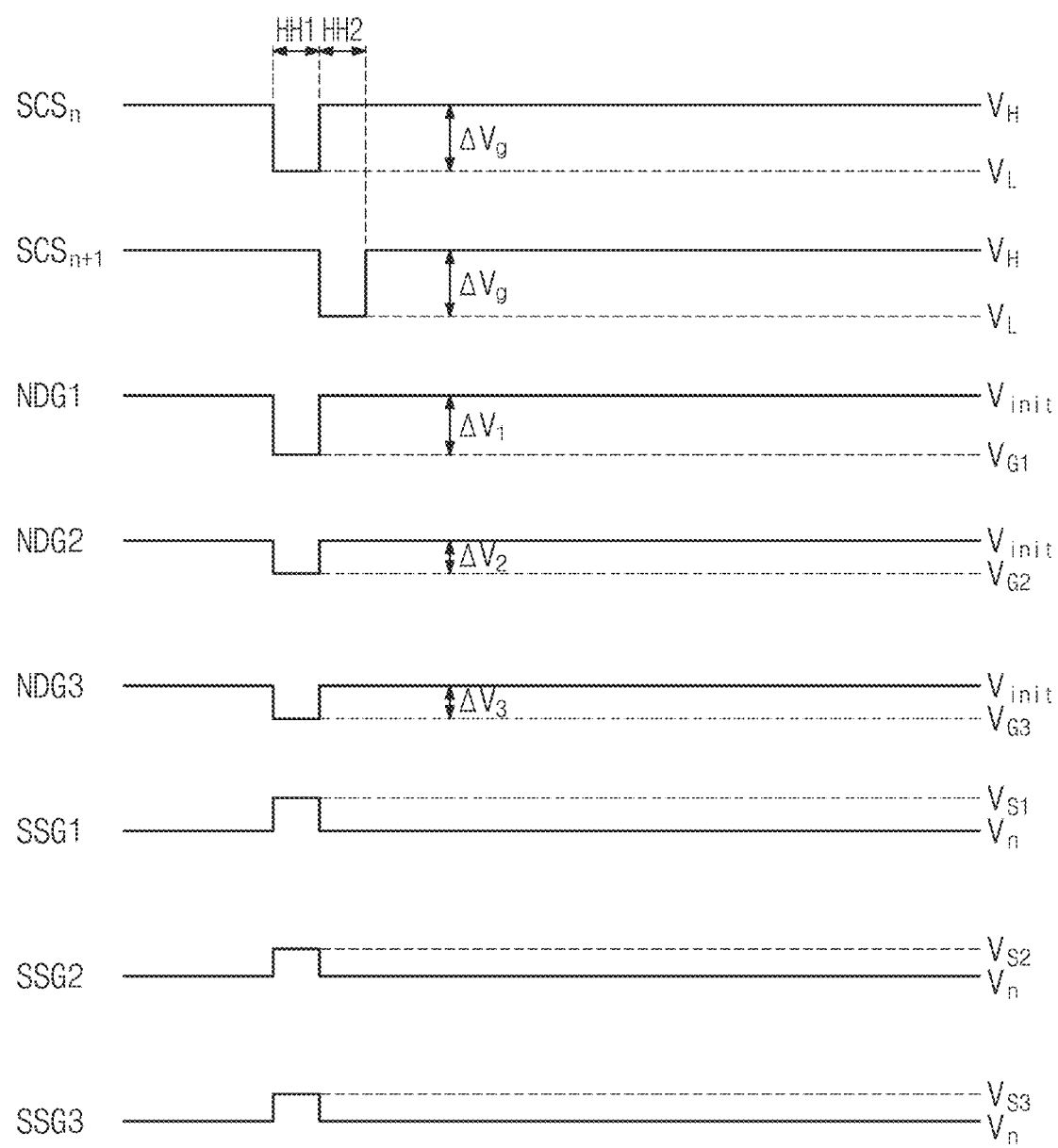
FIG. 6 is a timing diagram showing a signal applied to the sensor and a signal outputted from the sensor shown in FIG. 5.

FIG. 4 is a plan view of a fingerprint detection module 210 according to an embodiment of the inventive concept. FIG. 5 is an equivalent circuit diagram of a sensor SN according to an embodiment of the inventive concept. FIG. 6 is a timing diagram showing a signal applied to the sensor SN and a signal outputted from the sensor SN shown in FIG. 5.

Referring to FIG. 4, the fingerprint detection module 210 includes an input recognition area FPA and a non-input recognition area NFPA on a plane. In an embodiment of the inventive concept, each of the first sensing area SA1 and the second sensing area SA2 may include an input recognition area FPA and a non-input recognition area NFPA.

The fingerprint detection module 210 includes a plurality of scan lines SL, a plurality of readout lines RL, a plurality of sensor-power lines PL-S, a plurality of reference lines PL-R, and a plurality of sensors SN. An area in which the plurality of sensors SN are disposed may be defined as an input recognition area FPA.

The scan lines SL are connected to a corresponding sensor SN among the plurality of sensors SN, and the readout lines RL are connected to a corresponding sensor SN among the plurality of sensors SN. The sensor-power lines PL-S are connected to a corresponding sensor SN among the plurality of sensors SN, and the reference lines PL-R are connected to a corresponding sensor SN among the plurality of sensors SN.

The separation distance between adjacent sensors SN among the plurality of sensors SN may be 3 μm or more and 120 μm or less, and preferably, the separation distance between the sensors SN may be 20 μm or more and 100 μm or less. When the separation distance between the sensors SN is greater than 100 μm, it may not be possible to obtain a sufficient resolution required to recognize a fingerprint. If the separation distance is less than 20 μm, the process may be complicated and manufacturing cost may increase.

The scan driving circuit SCV to which the scan lines SL are connected may be disposed on one side of the non-input recognition area NFPA.

A readout circuit RCV to which the readout lines RL are connected may be disposed on one side of the non-input recognition area NFPA. In another embodiment of the inventive concept, a signal applied from an external integrated circuit may be applied to the readout lines RL without the readout circuit RCV.

The scan signals are sequentially supplied to the scan lines SL, and the readout lines RL may receive signals outputted from the sensor SN and transmit the received signals to the readout circuit RCV. In another embodiment of the inventive concept, signals outputted from the sensor SN may be transmitted to other circuits (not shown) that process the outputted signals.

In FIG. 5, a sensor SN connected to the scan lines SLn and SLn+1 and the readout line RL is illustrated as an example. The configuration of the sensor SN is not limited thereto and may be changed.

The sensor SN may include a first transistor TFT1, a reference capacitor Cref, and a second transistor TFT2.

The first transistor TFT1 includes a first input electrode, a first output electrode, and a first control electrode.

The first input electrode is connected to the sensor-power line PL-S. The first input electrode may receive the power voltage VDD from the sensor-power line PL-S.

The first output electrode is connected to the readout line RL. In one embodiment of the inventive concept, the first output electrode may be directly connected to the readout line RL to provide a signal received by the first input electrode to the readout line RL.

The first control electrode may be connected to the second transistor TFT2 and the reference capacitor Cref.

The first transistor TFT1 may be disposed in the form of a single transistor between the readout line RL and the sensor-power line PL-S. The single transistor type means a structure in which only one transistor exists between two points.

The reference capacitor Cref includes a first electrode ED1 and a second electrode ED2. The first electrode ED1 is connected to the n-th scan line SLn among the plurality of scan lines SL. The first electrode ED1 may be formed to be branched from the n-th scan line SLn. The second electrode ED2 is connected to the first control electrode of the first transistor TFT1.

The second transistor TFT2 includes a second input electrode, a second output electrode, and a second control electrode.

The second input electrode is connected to the reference line PL-R. The second input electrode may receive an initialization voltage Vinit from the reference line PL-R.

The second output electrode is connected to the first control electrode of the first transistor TFT1. In addition, the second output electrode is connected to the second electrode ED2 of the reference capacitor Cref.

The second control electrode is connected to the (n+1)-th scan line SLn+1 of the plurality of scan lines. The second control electrode is turned on by a signal applied from the (n+1)-th scan line SLn+1 to output the initialization voltage Vinit through the second output electrode.

The sensor SN further includes a third electrode ED3. The third electrode ED3 is connected to the first control electrode of the first transistor TFT1. In addition, the third electrode ED3 is connected to the second electrode ED2 of the reference capacitor Cref.

The third electrode ED3 may form a capacitance $C_{fg}$ with an external object. The external object may be a fingerprint of a finger FP (see FIG. 3). The capacitance $C_{fg}$ may be a first capacitance C1 (see FIG. 3) or a second capacitance C2 (see FIG. 3).

A portion to which the first control electrode of the first transistor TFT1, the second output electrode of the second transistor TFT2, the second electrode ED2, and the third electrode ED3 are electrically connected may be defined as a node ND. The degree to which the first transistor TFT1 is turned on varies according to the level of the voltage of the node ND.

Referring to FIG. 6, scan signals SCSn and SCSn+1 are sequentially applied to an n-th scan line SLn and an (n+1)-th scan line SLn+1. Each of the scan signals SCSn and SCSn+1 may have a high voltage $V_H$ and a low voltage $V_L$. In an embodiment of the inventive concept, the high voltage $V_H$ may be about 4V to about 6V, and the low voltage $V_L$ may be about −4V to about −6V. Each of the scan signals SCSn and SCSn+1 may be a signal having a pulse waveform.

The voltage change amount $\Delta Vg$ of the scan signal is a value corresponding to the difference between the high voltage $V_H$ and the low voltage $V_L$.

The n-th scan signal SCSn is applied to the first electrode ED1 of the reference capacitor Cref (see FIG. 5) through the n-th scan line SLn. In the first section HH1, the low voltage $V_L$ is applied to the first electrode ED1.

At this time, the voltage of the node ND changes. Depending on whether there is no touch, whether the ridge of the fingerprint is in contact, or whether the valley of the fingerprint is in contact, the voltage change amounts $\Delta V1$, $\Delta V2$, and $\Delta V3$ of the node ND may be classified into a first voltage change amount $\Delta V1$, a second voltage change amount $\Delta V2$, or a third voltage change amount $\Delta V3$, respectively.

The first node signal NDG1 represents a change in the voltage value of the node ND when the third electrode ED3 does not form a capacitance with an external object (or fingerprint). The first node signal NDG1 has an initialization voltage Vinit and a first node voltage $V_{G1}$. In an embodiment of the inventive concept, the initialization voltage Vinit may be about 4V to about 6V, and the first node voltage $V_{G1}$ may be about −2V to about −4V.

The first voltage change amount $\Delta V1$ is a value corresponding to the difference between the initialization voltage Vinit and the first node voltage $V_{G1}$.

The second node signal NDG2 represents a change in the voltage value of the node ND when the third electrode ED3 forms a capacitance with the ridge of the fingerprint. The second node signal NDG2 has an initialization voltage Vinit and a second node voltage $V_{G2}$. In an embodiment of the inventive concept, the initialization voltage Vinit may be about 4V to about 6V, and the second node voltage $V_{G2}$ may be about −1V to about 1V.

The second voltage change amount $\Delta V2$ is a value corresponding to the difference between the initialization voltage Vinit and the second node voltage $V_{G2}$.

The third node signal NDG3 represents a change in the voltage value of the node ND when the third electrode ED3 forms a capacitance with the valley of the fingerprint. The third node signal NDG3 has an initialization voltage Vinit and a third node voltage $V_{G3}$. In an embodiment of the inventive concept, the initialization voltage Vinit may be about 4V to about 6V, and the third node voltage $V_{G3}$ may be about −1V to about 1V.

The third voltage change amount $\Delta V3$ is a value corresponding to the difference between the initialization voltage Vinit and the third node voltage $V_{G3}$.

The first voltage change amount $\Delta V1$ is larger than the second voltage change amount $\Delta V2$. In addition, the second voltage change amount $\Delta V2$ is larger than the third voltage change amount $\Delta V3$. As described above, since the voltage change amounts $\Delta V1$, $\Delta V2$, and $\Delta V3$ of the node ND are different, the voltage of the node ND is different, so that the degree to which the first transistor TFT1 is turned on is different. The sensing signals SSG1, SSG2, and SSG3 outputted to the readout line RL are different due to a difference in the degree to which the first transistor TFT1 is turned on.

When the first node signal NSG1 is applied to the node ND, the first sensing signal SSG1 is outputted to the readout line RL. The first sensing signal SSG1 has a reference voltage Vn and a first sensing voltage $V_{S1}$. Specifically, in the first section HH1, the first sensing signal SSG1 has a first sensing voltage $V_{S1}$. In an embodiment of the inventive concept, the reference voltage Vn may be 0V, and the first sensing voltage $V_{S1}$ may be about 3V to about 5V.

When the second node signal NSG2 is applied to the node ND, the second sensing signal SSG2 is outputted to the readout line RL. The second sensing signal SSG2 has a reference voltage Vn and a second sensing voltage $V_{S2}$. Specifically, in the first section HH1, the second sensing signal SSG2 has a second sensing voltage $V_{S2}$. In an embodiment of the inventive concept, the reference voltage Vn may be 0V, and the second sensing voltage $V_{S2}$ may be about 2V to about 3V.

When the third node signal NDG3 is applied to the node ND, the third sensing signal SSG3 is outputted to the readout line RL. The third sensing signal SSG3 has a reference voltage Vn and a third sensing voltage $VS_3$. Specifically, in the first section HH1, the third sensing signal SSG3 has a third sensing voltage $VS_3$. In an embodiment of the inventive concept, the reference voltage Vn may be 0V, and the third sensing voltage $VS_3$ may be about 2V to about 3V.

The first sensing voltage $V_{S1}$ is greater than the second and third sensing voltages $V_{S2}$ and $V_{S3}$. That is, the voltage $V_{S1}$ outputted to the readout line RL when the fingerprint is not in contact is greater than the voltages $V_{S2}$ and $V_{S3}$ outputted to the readout line RL when the fingerprint is in contact.

The second sensing voltage $V_{S2}$ is greater than the third sensing voltage $V_{S3}$. That is, the voltage $V_{S2}$ outputted to the readout line RL when the fingerprint valley is in contact is greater than the voltage $VS_3$ outputted to the readout line RL when the fingerprint ridge is in contact.

In this way, by measuring what voltage value the sensing signals SSG1, SSG2, SSG3 outputted to the readout line RL have in the first section HH1, the fingerprint of the finger may be recognized.

In the second section HH2 occurring after the first section HH1, the second transistor TFT2 is turned on by the (n+1)-th scan signal SCSn+1 applied to the second control electrode of the second transistor TFT2. When the second transistor TFT2 is turned on, the initialization voltage Vinit applied to the second input electrode is provided to the node ND through the second output electrode.

Figure 7:
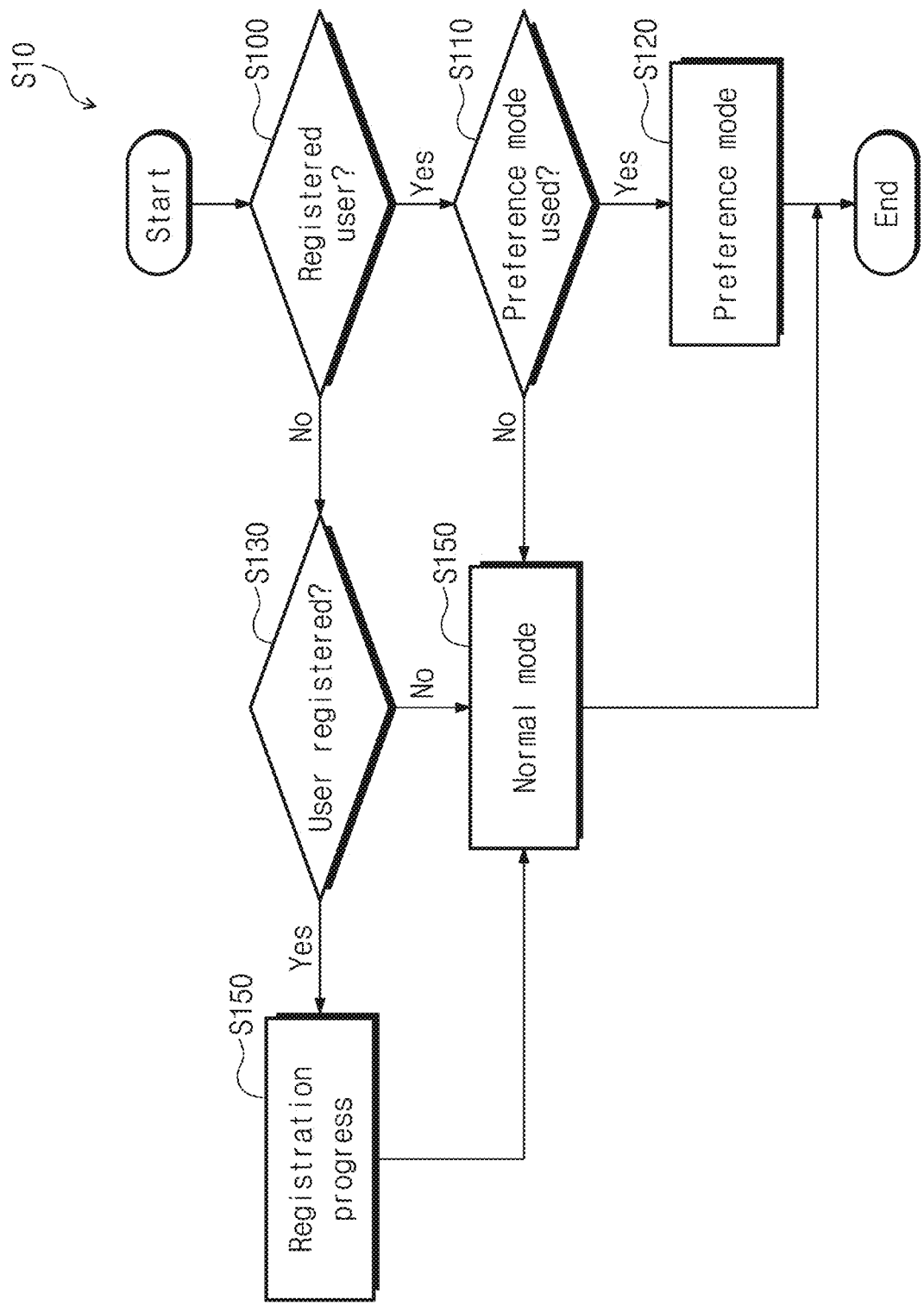
FIG. 7 is a flowchart illustrating a mode selection operation of a device controlled by a controller according to an embodiment of the inventive concept.
Figure 8:
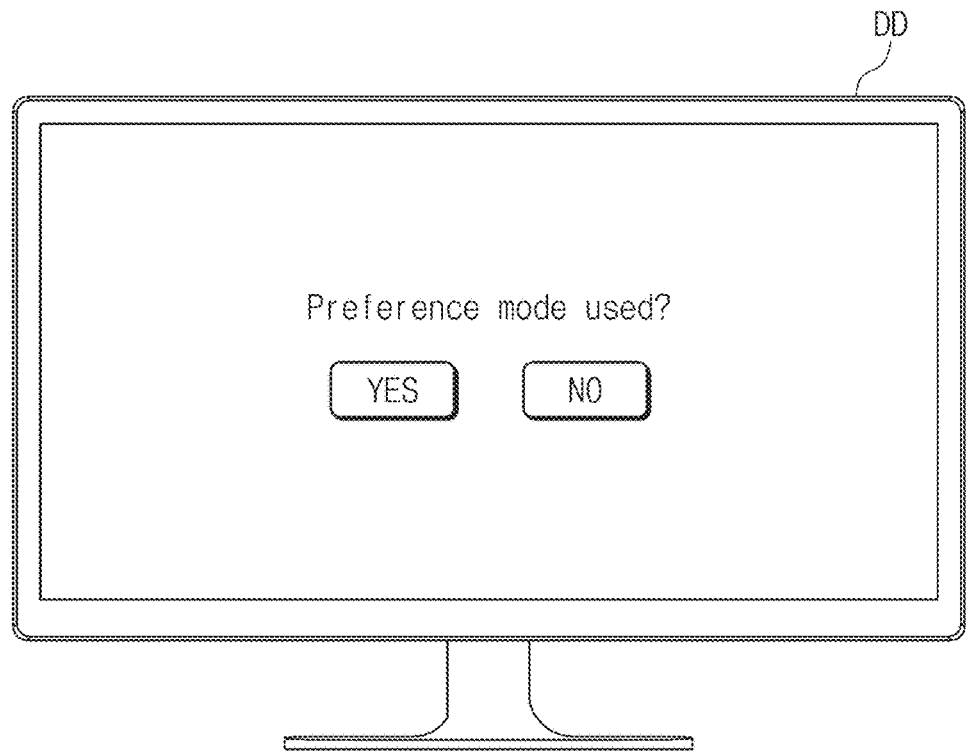
FIG. 8 exemplarily shows an image displayed on a display device in an operation of a preference mode usage inquiry.
Figure 8:
Figure 9A:
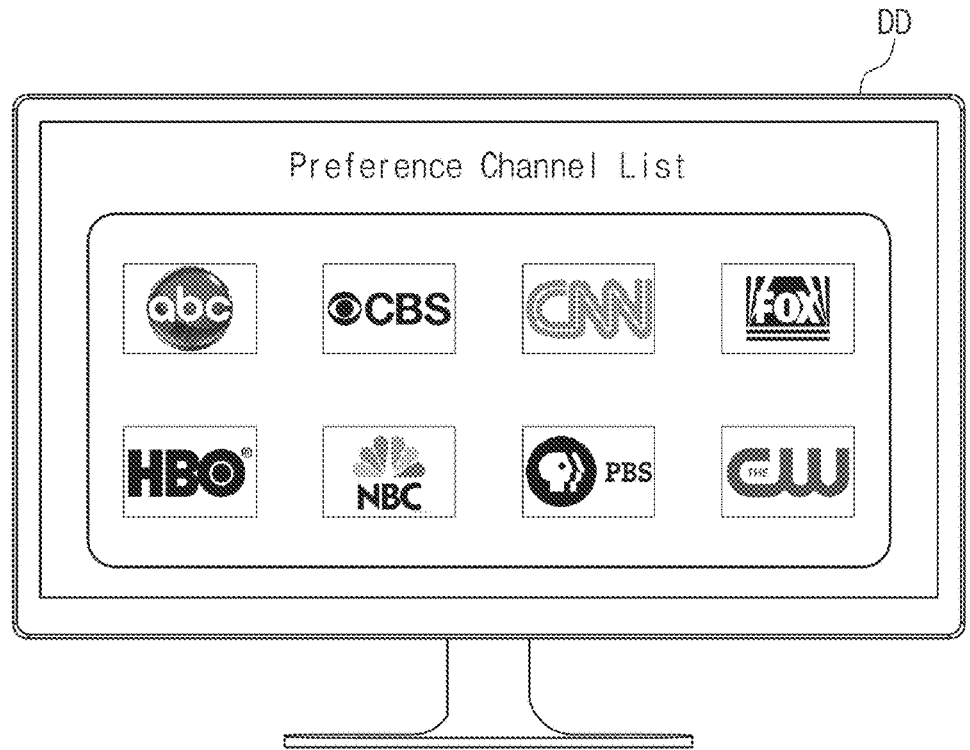
FIGS. 9A and 9B exemplarily show an image displayed on a display device in a preference mode driving operation.
Figure 9A:
Figure 9B:
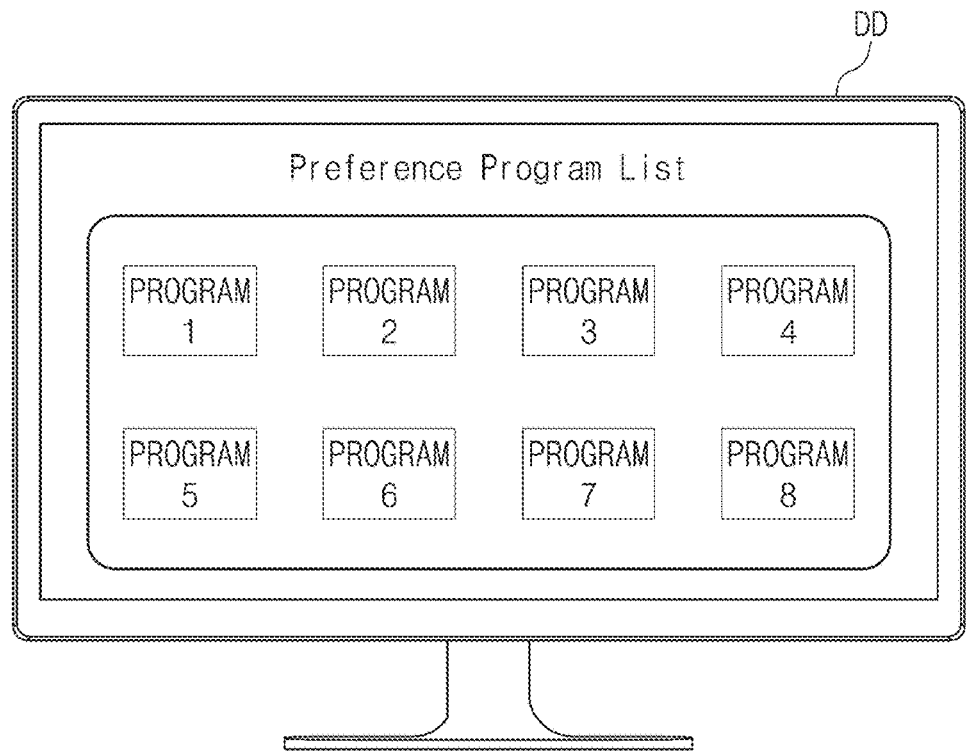
Figure 9B:
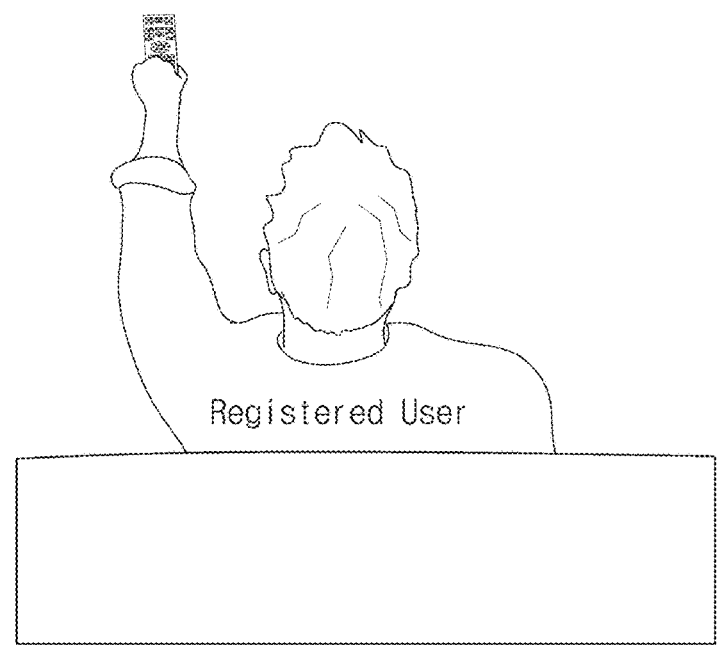
Figure 10:
FIG. 10 exemplarily illustrates an image displayed on a display device in a user registration inquiry operation.
Figure 10:
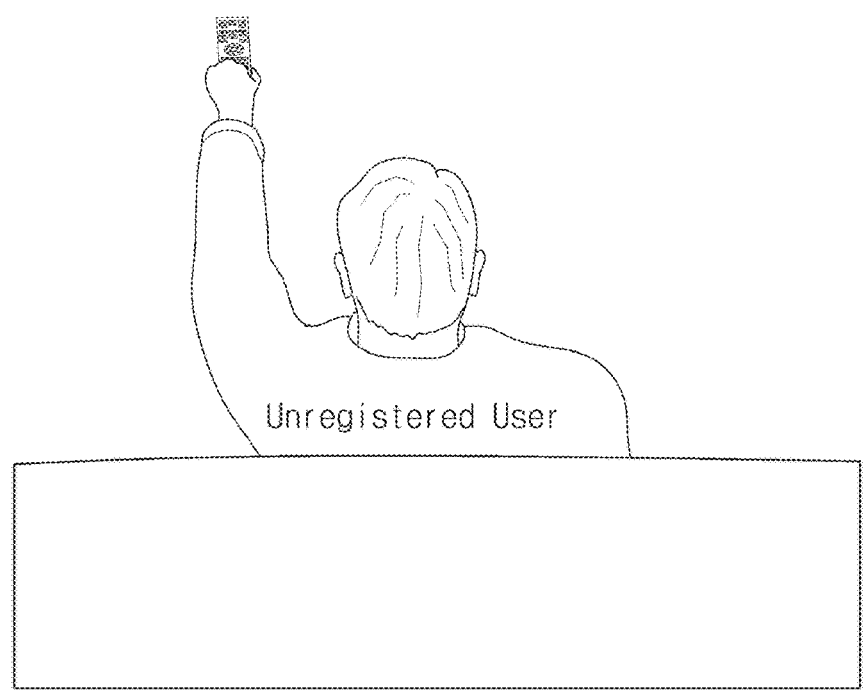
Figure 11:
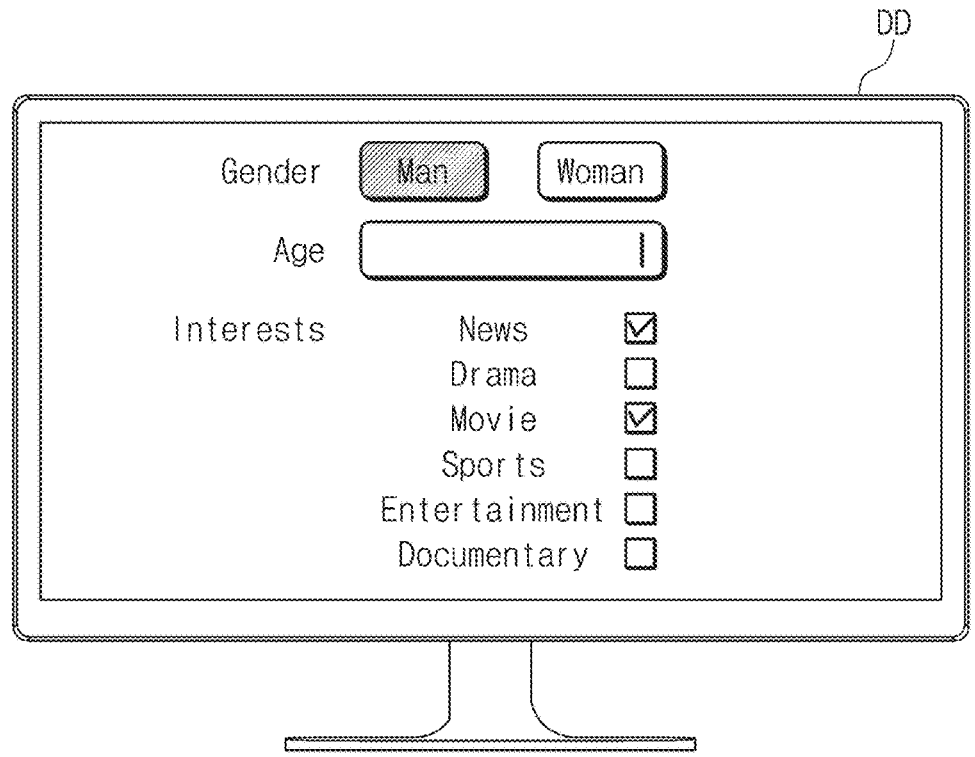
FIG. 11 exemplarily shows an image displayed on a display device in a user registration operation.
Figure 11:
Figure 11:
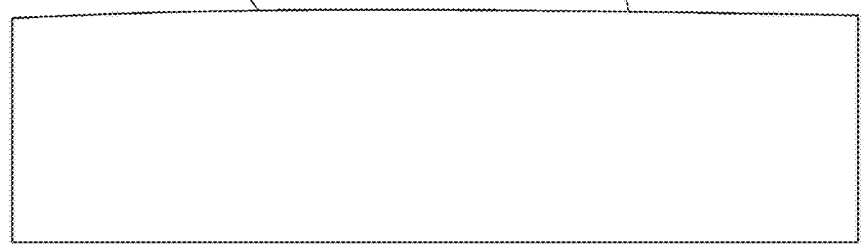

FIG. 7 is a flowchart illustrating a mode selection operation S10 of a device controlled by a controller CTU according to an embodiment of the inventive concept. FIG. 8 exemplarily shows an image displayed on the display device DD in the preference mode usage inquiry operation S110. FIGS. 9A and 9B exemplarily show an image displayed on the display device DD in the preference mode driving operation S120. FIG. 10 exemplarily illustrates an image displayed on the display device DD in the user registration inquiry operation S130. FIG. 11 exemplarily illustrates an image displayed on the display device DD in the user registration operation S140.

In an embodiment of the inventive concept, the display device DD or the set-top box STD may be driven in a preference mode or a normal mode through the mode selection operation S10.

When the display device DD or the set-top box STD is driven in the preference mode, the display device DD may display a channel list or a program list that a user using the controller CTU prefers. When the display device DD or the set-top box STD is driven in a normal mode, an image provided by a broadcaster or a satellite broadcasting service provider may be displayed on the display device DD.

The mode selection operation S10 may include a user determination operation S100, a preference mode usage inquiry operation S110, a preference mode driving operation S120, a user registration inquiry operation S130, a user registration operation S140, and a normal mode driving operation S150.

Referring to FIGS. 2B, 3, and 7, in user determination operation S100, the controller CTU may compare the user's fingerprint FP detected through the fingerprint detection module 210 with fingerprint information stored in the memory part 300, and determine whether the detected fingerprint corresponds to any fingerprint information previously stored in the memory part 300.

If the detected fingerprint is a fingerprint previously stored in the memory part 300, the controller CTU may determine that the current user is a previously registered user, and transmit a control signal to the display device DD or the set-top box STD so that the preference mode usage inquiry operation S110 is executed on the display device DD.

Referring to FIG. 8, in the preference mode usage inquiry operation S110, an image including a message asking whether to use the preference mode may be displayed on the display device DD. The user may provide a signal corresponding to whether or not to drive the preference mode to the display device DD or the set-top box STD by using the controller CTU.

In an embodiment of the inventive concept, when the user selects the preference mode in the preference mode usage inquiry operation S110, in the preference mode driving operation S120, a preference channel list may be displayed on the display device DD as shown in FIG. 9A. In FIG. 9A, the preference channel list is arranged using a broadcaster name or a broadcaster logo, but is not limited thereto, and in another embodiment, the preference channel list may be arranged using the channel number.

The controller CTU may receive from the display device DD or the set-top box STD at least one of information corresponding to the total time the registered user has watched the channel, information corresponding to the number of views, information corresponding to the watched time zone, information corresponding to the viewing date, and the previously entered user's personal information. The controller CTU may store the received information as preference information in the memory part 300. The controller CTU may calculate a preference channel list using the stored preference information.

In an embodiment of the inventive concept, when the user selects the preference mode in the preference mode usage inquiry operation S110, in the preference mode driving operation S120, a preference channel list may be displayed on the display device DD as shown in FIG. 9B. In FIG. 9B, the preference channel list is displayed as PROGRAM 1 to PROGRAM 8 and is arranged, but is not limited thereto and in another embodiment, the preference program list may be sorted using an actual program logo.

The controller CTU may receive from the display device DD or the set-top box STD at least one of information corresponding to the total time the registered user has watched the program, information corresponding to the number of views, information corresponding to the watched time zone, information corresponding to the viewing date, and the previously entered user's personal information. The controller CTU may store the received information as preference information in the memory part 300. The controller CTU may calculate a preference program list using the stored preference information.

When the user does not select the preference mode in the preference mode usage inquiry operation S110, the normal mode driving operation S150 may be executed.

If the fingerprint detected in the user determination operation S100 is not a fingerprint previously stored in the memory part 300, the controller CTU may determine that the current user is not a previously registered user, and transmit a control signal to the display device DD or the set-top box STD so that the user registration inquiry operation S130 is executed.

Referring to FIG. 10, in the user registration inquiry operation S130, an image including a message asking whether to perform user/fingerprint registration may be displayed on the display device DD. The user may provide a signal for selecting whether to drive the user registration operation S140 using the controller CTU to the display device DD or the set-top box STD.

In one embodiment of the inventive concept, when the user selects user registration in the user registration inquiry operation S130, an image including a user information input window may be displayed on the display device DD as shown in FIG. 11 in the user registration operation S140.

In the user registration operation S140, the user may input information in at least one item of gender, age, and interest field using the controller CTU. The inputted information may be stored in the memory part 300 of the controller CTU.

The controller CTU may calculate a preference channel list or a preference program list using information inputted in the user registration operation S140.

When the user does not select user registration in the user registration inquiry operation S130, the normal mode driving operation S150 may be executed.

Figure 12:
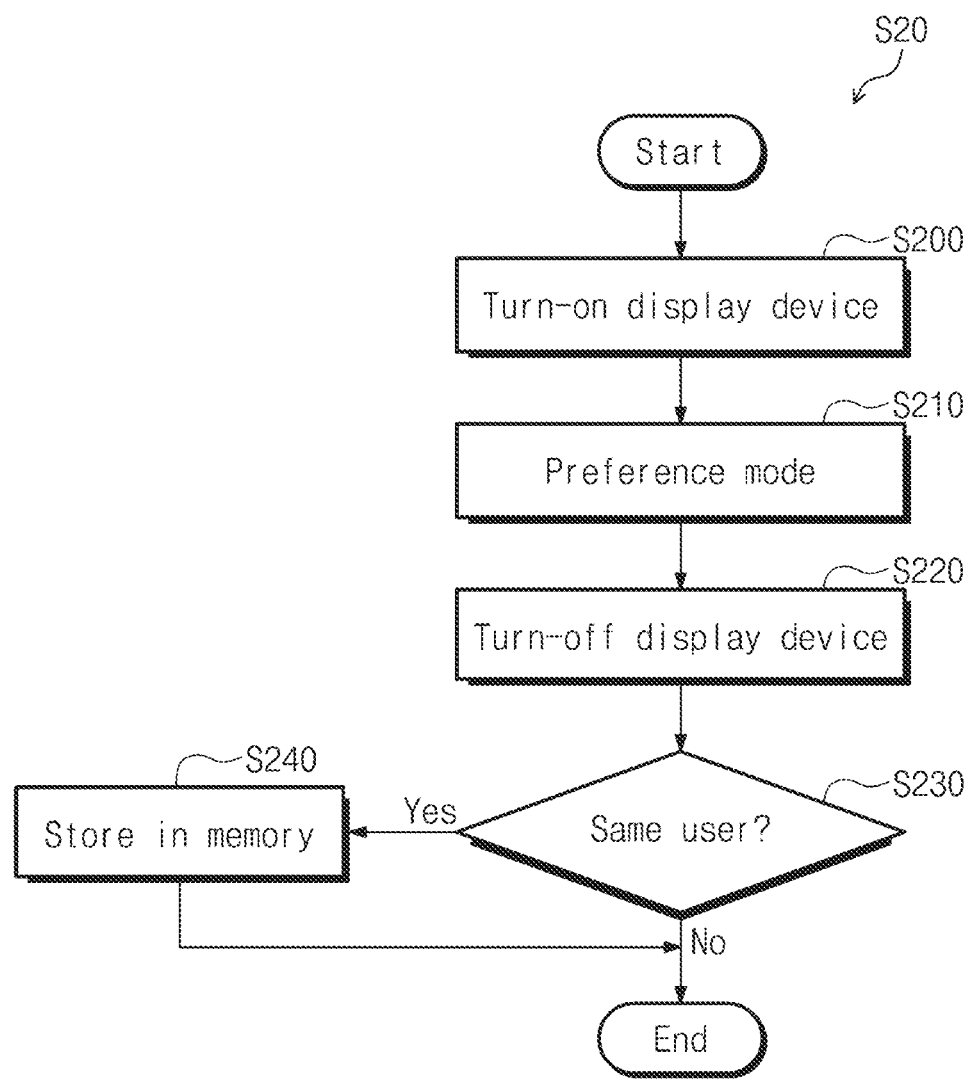
FIG. 12 is a flowchart illustrating a viewing history storage operation according to an embodiment of the inventive concept.

FIG. 12 is a flowchart illustrating a viewing history storage operation S20 according to an embodiment of the inventive concept.

The viewing history storage operation S20 may include a display device turn-on operation S200, a preference mode operation S210, a display device turn-off operation S220, a same user determination operation S230, and a memory storage operation S240.

In the display device turn-on operation S200, the user turns on the display device DD using the controller CTU. In this case, the controller CTU may detect a user's fingerprint and generate first detection information corresponding to the detected fingerprint.

When the preference mode is driven in the preference mode operation S210, the controller CTU may receive information for forming preference information from the display device DD or the set-top box STD.

In the display device turn-off operation S220, the user turns off the display device DD using the controller CTU. In this case, the controller CTU may detect the user's fingerprint and generate second detection information corresponding to the detected fingerprint.

When the display device DD is turned off, the controller CTU compares the first detection information and the second detection information to determine whether the user at the time of turn-on and the user at the time of turn-off are the same.

If the user at turn-on and the user at turn-off are the same, in the memory storage operation S240, the controller CTU may store information received from the display device DD or the set-top box STD in the memory part 300, and use the stored information to update the previously stored preference information.

If the user at turn-on and the user at turn-off are not the same, the controller CTU may determine that the information received from the display device DD or the set-top box STD is not suitable for updating the previously stored preference information, and may not store the received information in the memory part 300.

Figure 13:
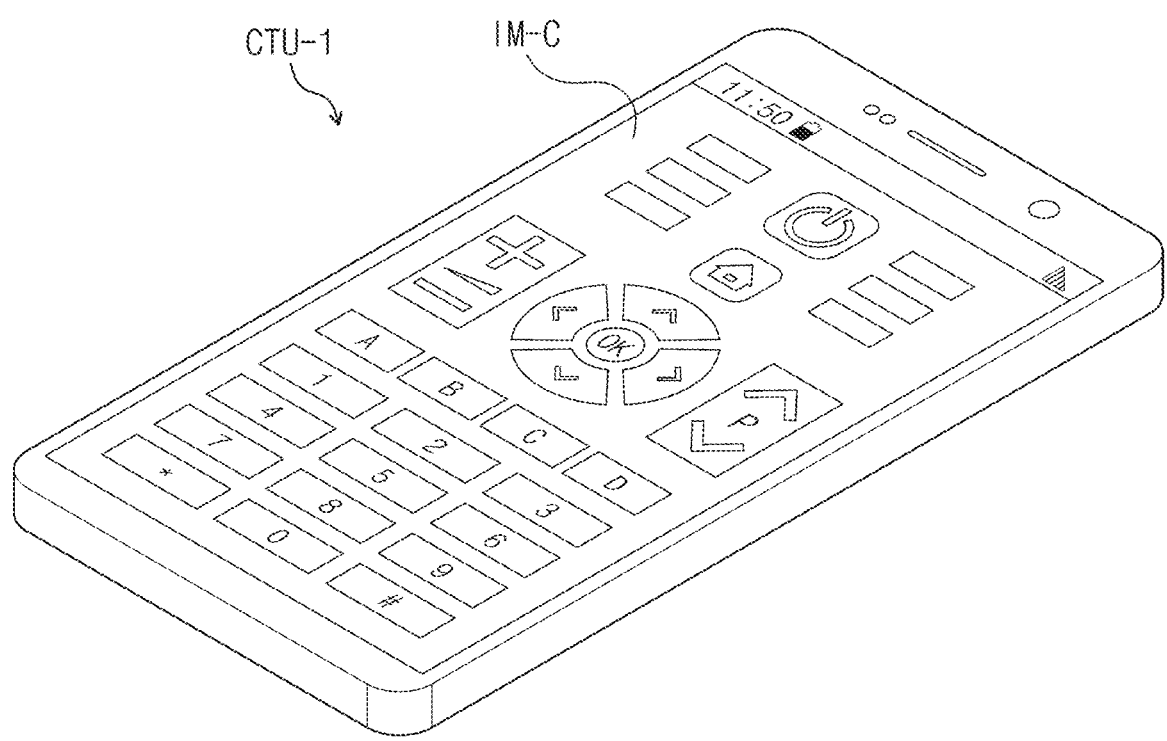
FIG. 13 illustrates a controller according to an embodiment of the inventive concept.

FIG. 13 shows a controller CTU-1 according to an embodiment of the inventive concept.

The control image IM-C is displayed on the display area DA of the controller CTU-1 shown in FIG. 13, and the user may control the display device DD or the set-top box STD by touching the control image IM-C.

The controller CTU-1 may include a display panel (not shown), such as a liquid crystal display or an organic light emitting diode display, and a fingerprint detection module 210 (see FIG. 3).

The controller CTU-1 of FIG. 13 may be a smartphone, but that is just an example and not a limitation. For example, the controller CTU-1 may be a tablet, PC, a watch type display device, or other wearable display device.

Although described with reference to embodiments, those skilled in the art will appreciate that various modifications and changes may be made to the inventive concept within the scope not departing from the spirit and scope of the inventive concept described in the following claims In addition, the embodiments disclosed in the inventive concept are not intended to limit the technical idea of the inventive concept, and all technical ideas within the scope of the following claims and equivalents should be construed as being included in the scope of the inventive concept.

The invention claimed is:

1. A controller comprising:
a memory part storing a plurality of fingerprint information and a plurality of preference information, wherein each of the plurality of fingerprint information is associated with one of a plurality of preference information;
a sensor part including a fingerprint detection module for detecting a fingerprint;
a control part determining fingerprint information that is associated with the fingerprint detected by the fingerprint detection module among the plurality of fingerprint information, and selecting preference information associated with the determined fingerprint information; and
a communication part transmitting the selected preference information to a first external device wherein when the first external device or a second external device communicating with the first external device displays an image,
the communication part receives, from the first external device or the second external device, at least one of information on a date when the image is displayed, information on a time when the image is displayed, information on a period while the image is displayed, channel information corresponding to the image, and program information corresponding to the image.

2. The controller of claim 1, wherein the first external device is a display device, wherein the second external device is a set-top box.

3. The controller of claim 1, wherein the control part updates the selected preference information using the at least one information received by the communication part.

4. The controller of claim 1, wherein the control part calculates preference channel information using the selected preference information,
wherein the communication part transmits the calculated preference channel information to at least one of the first external device and the second external device, and controls at least one of the first external device and the second external device to display a preference channel list image corresponding to the calculated preference channel information.

5. The controller of claim 1, wherein the control part calculates preference program information using the selected preference information,
wherein the communication part transmits the calculated preference program information to at least one of the first external device and the second external device, and controls at least one of the first external device and the second external device to display a preference program list image corresponding to the calculated preference program information.

6. The controller of claim 1, wherein when a fingerprint detected by the sensor part corresponds to any one of the plurality of fingerprint information stored in the memory part,
the communication part transmits a control signal to at least one of the first external device and the second external device to display an image asking whether the first external device or the second external device uses a user preference mode.

7. The controller of claim 1, wherein when the fingerprint detected by the sensor part does not correspond to the plurality of fingerprint information stored in the memory part,
the communication part transmits a control signal to at least one of the first external device or the second external device to display an image asking whether the first external device or the second external device proceeds with user registration.

8. The controller of claim 1, further comprising a power button for turning on or off power of at least one of the first external device and the second external device,
wherein the fingerprint detection module is mounted on the power button.

9. The controller of claim 8, wherein when first detection information corresponding to a fingerprint that is detected when the power of the first external device or the second external device is turned on using the power button and second detection information corresponding to a fingerprint detected when the first external device or the second external device is turned off using the power button are the same, the at least one information received from the first external device or the second external device is stored in the memory part.

10. The controller of claim 9, wherein when the first detection information and the second detection information are different,
the at least one piece of information received from the first external device or the second external device is not stored in the memory part.

11. The controller of claim 1, further comprising a channel selection button for changing the image displayed by the first external device or the second external device,
wherein the fingerprint detection module is mounted on the channel selection button.

12. The controller of claim 1, wherein the sensor part further comprises at least one of a voice recognition sensor and a motion recognition sensor.

13. A controller comprising:
a memory part storing a plurality of fingerprint information and a plurality of preference information, wherein each of the plurality of fingerprint information is associated with one of the plurality of preference information;

an input part including a power button capable of turning on or off power of at least one of a display device and a set-top box;

a sensor part including a fingerprint detection module with a plurality of sensors for detecting a fingerprint, wherein the plurality of sensors are mounted on the power button;

a control part determining fingerprint information corresponding to the fingerprint detected by the fingerprint detection module from among the plurality of fingerprint information, and selecting preference information corresponding to the determined fingerprint information among the plurality of preference information; and a communication part transmitting the selected preference information to at least one of the display device and the set-top box wherein when the display device displays an image, the communication part receives, from the display device or the set-top box, at least one of information on a date when the image is displayed, information on a time when the image is displayed, information on a period while the image is displayed, channel information corresponding to the image, and program information corresponding to the image.

14. The controller of claim 13, further comprising a clock part for determining at least one of the date information, the time information, and the period information.

15. The controller of claim 13, wherein the control part updates the selected preference information using the at least one information received by the communication part.

16. The controller of claim 13, wherein the control part calculates preference channel information using the selected preference information, wherein the communication part transmits the calculated preference channel information to at least one of the display device and the set-top box, and controls the display device to display a preference channel list image corresponding to the calculated preference channel information.

17. The controller of claim 13, wherein the control part calculates preference program information using the selected preference information, wherein the communication part transmits the calculated preference program information to at least one of the display device and the set-top box, and controls the display device to display a preference program list image corresponding to the calculated preference program information.

18. The controller of claim 13, wherein when the fingerprint detected by the sensor part does not correspond to the plurality of fingerprint information stored in the memory part, the communication part transmits a control signal to at least one of the display device and the set-top box to display an image requesting fingerprint registration.

* * * * *